United States Patent
O'Connell et al.

(10) Patent No.: US 8,131,268 B2
(45) Date of Patent: Mar. 6, 2012

(54) MANAGING WIRELESS TRANSMISSIONS UPON UNINTENTIONAL DISCONNECTION OF SERVICE

(75) Inventors: Brian M. O'Connell, Austin, TX (US); Martinianus B. Hadinata, Brunnen (CH); Charles S. Lingafelt, Durham, NC (US); John E. Moore, Brownsburg, IN (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 12/186,175

(22) Filed: Aug. 5, 2008

(65) Prior Publication Data

US 2010/0035583 A1 Feb. 11, 2010

(51) Int. Cl.
*H04M 11/10* (2006.01)
*H04M 1/663* (2006.01)
(52) U.S. Cl. ..................... 455/413; 455/412.2
(58) Field of Classification Search .................. 455/413, 455/418–420, 517–519, 412.1, 417, 424, 455/445, 412.2, 414.1; 379/88.12, 88.18, 379/88.22–88.23, 88.25–88.27
See application file for complete search history.

(56) References Cited

U.S. PATENT DOCUMENTS

| | | | |
|---|---|---|---|
| 5,995,830 A * | 11/1999 | Amin et al. ................... | 455/423 |
| 6,408,177 B1 | 6/2002 | Parikh et al. | |
| 6,980,799 B2 * | 12/2005 | Akhteruzzaman et al. ............................ | 455/414.1 |
| 7,164,762 B2 | 1/2007 | Hanson et al. | |
| 7,228,145 B2 * | 6/2007 | Burritt et al. ................... | 455/519 |
| 7,389,107 B1 * | 6/2008 | Satapathy ................... | 455/412.1 |
| 7,796,977 B2 * | 9/2010 | Vander Veen ................. | 455/413 |
| 2002/0115429 A1 * | 8/2002 | Deluca et al. ................. | 455/413 |
| 2003/0134617 A1 * | 7/2003 | Duerk et al. ................... | 455/412 |
| 2004/0203645 A1 | 10/2004 | Forman et al. | |
| 2004/0235509 A1 | 11/2004 | Burritt et al. | |
| 2005/0048981 A1 * | 3/2005 | Anupam et al. .............. | 455/445 |
| 2008/0016575 A1 * | 1/2008 | Vincent et al. ................... | 726/26 |
| 2008/0167007 A1 * | 7/2008 | Novick et al. ................. | 455/413 |

* cited by examiner

*Primary Examiner* — Brandon Miller
(74) *Attorney, Agent, or Firm* — Yudell Isidore Ng Russelll PLLC

(57) ABSTRACT

Disclosed are a method, system and computer program product for managing unintentional disconnection of a communication device. A system detects a first device to a transmission has been unintentionally disconnected from an ongoing communication with a second communication device. The connected second device is signaled regarding the disconnection. Recording of a disconnection voicemail message for the disconnected first communication device is enabled before disconnecting the second communication device. The second device may set an expiration time on the disconnection voicemail message. Upon resumption of service, the disconnected first device is informed of a new voicemail message left by the second device during the disconnection. A disconnection-specific voicemail greeting may be recorded by a user of the disconnected first device's system for use when a disconnection occurs. The disconnection-specific voicemail greeting is played to the connected second device when disconnection occurs.

15 Claims, 4 Drawing Sheets

MANAGING WIRELESS TRANSMISSIONS UPON UNINTENTIONAL DISCONNECTION OF SERVICE

BACKGROUND

1. Technical Field

The present invention generally relates to telecommunications between wireless communication devices, and in particular to managing unintentional disconnection of a communication device from a transmission by at least one party.

2. Description of the Related Art

It is common with telecommunications, regardless of type, (e.g., VOIP, landline, cordless telephone, cellular telephone) for a party to be disconnected from the communications provider prematurely, ending an ongoing communication. Upon disconnection, both parties may attempt to reinitiate communications, or one party may wait for the other party to reinitiate communications. Sometimes, one party may be without wireless communication access for extended periods of time before communications may be reinitiated between the parties who were disconnected. Disconnections are commonly abrupt without prior explicit warning or communications degradation.

Current art methods require the participants in a wireless communication that is disconnected to reinitiate communications upon disconnection. This requires one party to reinitiate communications with the disconnected party. With most conventional implementations, if one party is without service at the time of reinitiation, the calling party will be transferred to voicemail of the receiving party.

SUMMARY OF ILLUSTRATIVE EMBODIMENTS

Disclosed are a method, system and computer program product for managing unintentional disconnection of a communication device. A system detects a first device to a transmission has been unintentionally disconnected from an ongoing communication with a second communication device. The connected second device is signaled regarding the disconnection. Recording of a disconnection voicemail message for the disconnected first communication device is enabled before disconnecting the second communication device. The second device may set an expiration time on the disconnection voicemail message. Upon resumption of service, the disconnected first device is informed of a new voicemail message left by the second device during the disconnection. A disconnection-specific voicemail greeting may be recorded by a user of the disconnected first device's system for use when a disconnection occurs. The disconnection-specific voicemail greeting is played to the connected second device when disconnection occurs.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
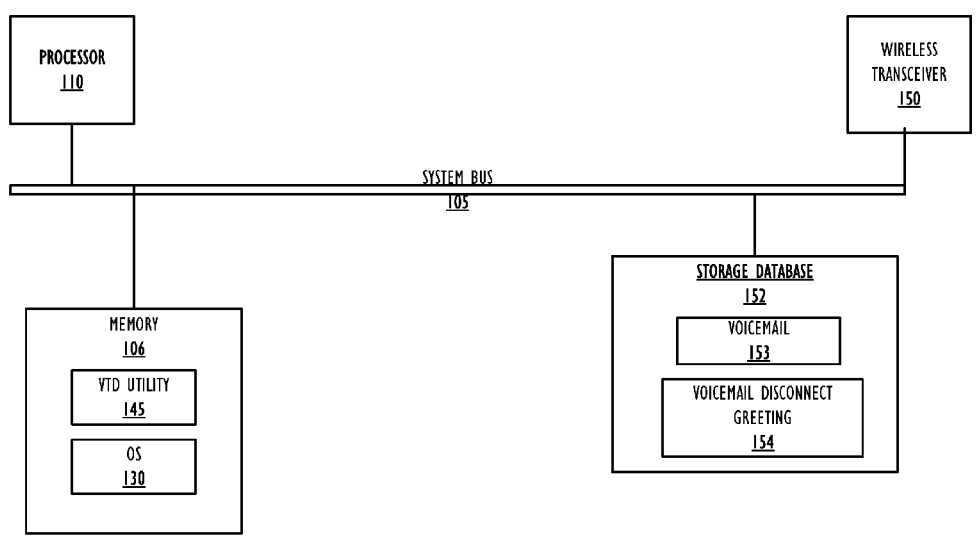
FIG. 1 is a block diagram of a service provider system configured with hardware and software components for implementing one or more embodiments of the invention.

The illustrative embodiments provide a method, system and computer program product for managing unintentional disconnection of a communication device. A system detects a first device to a transmission has been unintentionally disconnected from an ongoing communication with a second communication device. The connected second device is signaled regarding the disconnection. Recording of a disconnection voicemail message for the disconnected first communication device is enabled before disconnecting the second communication device. The second device may set an expiration time on the disconnection voicemail message. Upon resumption of service, the disconnected first device is informed of a new voicemail message left by the second device during the disconnection. A disconnection-specific voicemail greeting may be recorded by a user of the disconnected first device's system for use when a disconnection occurs. The disconnection-specific voicemail greeting is played to the connected second device when disconnection occurs.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 145 for FIG. 1 and 245 for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

While the embodiment to be subsequently described relates to cellular telephones, the principles of the invention would be applicable to any wireless personal communication device that could be used to communicate in a cellular or similar telecommunications system. These would include the wide variety of currently available communicating personal palm devices or Personal Digital Assistants (PDAs), which include, for example, devices using Microsoft's WinCE, Palm, Inc.'s Palm OS, and ACCESS's Garnet OS, or other such wireless communication device. Also, while the embodiment to be subsequently described relates primarily to voice transmissions, the embodiment may also apply to video transmissions, multimedia transmissions, and text transmissions. One embodiment of the invention may apply to wired communications.

With reference now to the figures, FIG. 1 depicts a block diagram representation of a service provider system (SPS). SPS 100 comprises at least one processor 110 connected to memory 106 via system interconnect/bus 105. Memory 106 is defined as a lowest level of volatile memory (not shown), which may include, but is not limited to, cache memory, registers, and buffers. Also connected to system bus 105 is a storage database 152, comprising a voicemail mailbox 153 and a voicemail disconnect-specific greeting component 154 for a user's wireless communication device (not shown).

SPS 100 is also illustrated with a wireless transceiver 150 coupled to system bus 105. Wireless transceiver 150 enables SPS 100 to connect to and exchange communication with one or more wireless communication devices.

Those of ordinary skill in the art will appreciate that the hardware depicted in FIG. 1 is a basic illustration of a service provider system, and thus the hardware utilized in actual implementation may vary. Thus, the depicted example is not meant to imply architectural limitations with respect to the present invention. Also, components of the SPS 100 may be distributed components, not present in a single device or single casing. Also, while the illustrative embodiments are described from the perspective of functions occurring at the SPS 100, it is appreciated that various functions of the described embodiments may also be performed by the wireless communication device. This implementation is also covered by the scope of the invention.

Notably, in addition to the above described hardware components of SPS 100, various features of the invention are completed via software (or firmware) code or logic stored within memory 106 or other storage (e.g., storage database 152) and executed by a processor 110. In one embodiment, data/instructions/code from storage database 152 populates the memory 106. Thus, illustrated within memory 106 are a number of software/firmware components, including operating system (OS) 130, and Voicemail Transfer upon Disconnect (VTD) utility 145.

In actual implementation, VTD utility 145 may be a single, clustered, or distributed application providing the various functions of multiple individual software components when the corresponding code is executed by the processor 110. For simplicity, VTD utility 145 is illustrated and described as a stand alone or separate software/firmware component, which is stored in memory 106 to provide/support the specific novel functions described herein. A user connection monitoring and voicemail transfer (UCMVT) component 245 as depicted in FIG. 2 operates as a VTD utility 145 within the mobile communication infrastructure 222 as depicted in FIG. 2.

Processor 110 executes VTD utility 145 as well as OS 130, which supports the user interface features of VTD utility 145. In the illustrative embodiment, VTD utility 145 generates/provides several graphical user interfaces (GUI) to enable user interaction with, or manipulation of, the functional features of the VTD utility 145. Among the software code/instructions provided by VTD utility 145, and which enables features specific to the invention, are: (a) code for detecting a first communication device to a transmission has been unintentionally disconnected from an ongoing communication with a second communication device; (b) code for signaling the second communication device of the unintentional disconnection by the first communication device; (c) code for enabling recording of a voicemail message to be left for the disconnected first communication device by the second communication device before disconnecting the second communication device; and (d) code for enabling pre-recording of a disconnection-specific voicemail greeting by the disconnected first communication device for use when a disconnection occurs during a later communication. For simplicity of the description, the collective body of code that enables these various features is referred to herein as VTD utility 145. According to the illustrative embodiment, when processor 110 executes VTD utility 145, SPS 100 initiates a series of functional processes that enable the above functional features as well as additional features/functionality, which are described below within the description of FIGS. 2-4.

Figure 2:
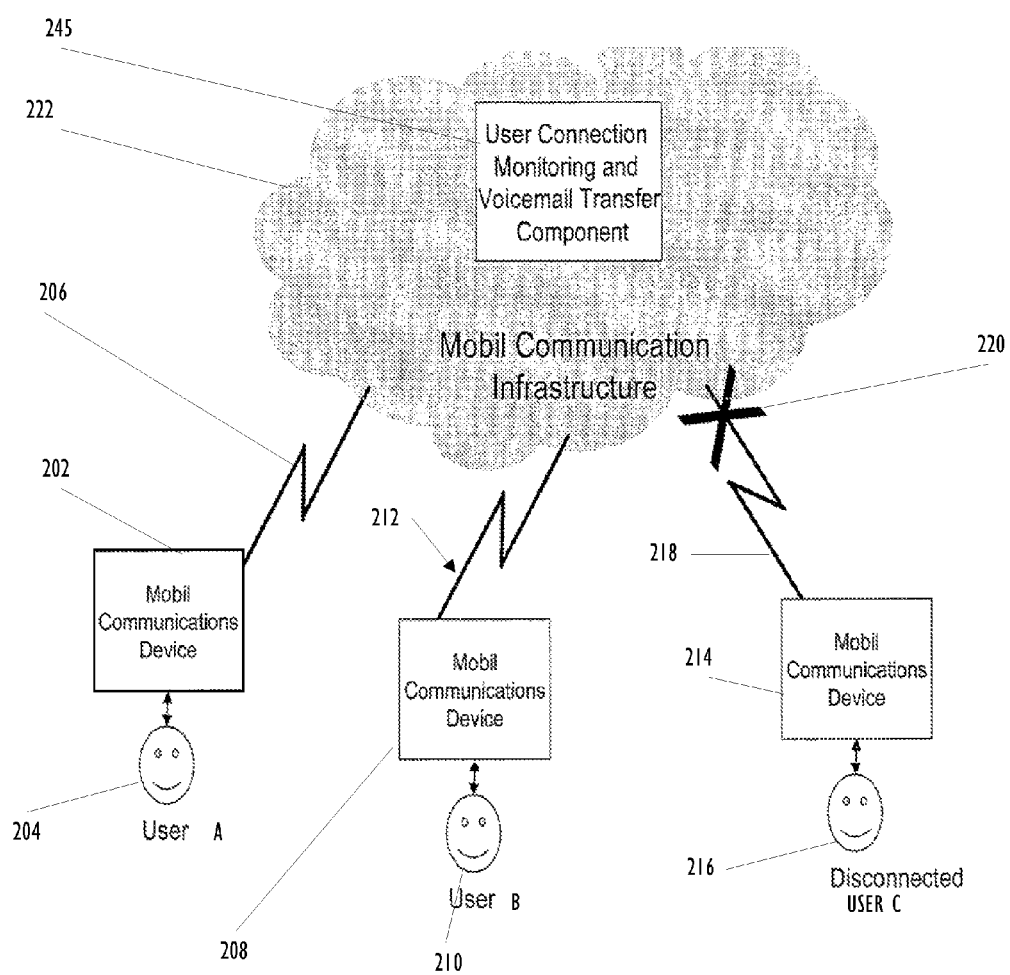
FIG. 2 illustrates a diagram of a call switching center that manages voicemail communication between a disconnected first device and remaining connected devices to a transmission, in accordance with one embodiment of the invention.

With reference now to FIG. 2, a diagram of a communication system is shown 200 in which a call switching component manages voicemail communication between a disconnected party and remaining connected parties to a wireless transmission. In FIG. 2, three users 204, 210, 216 are shown in communication with each other via their wireless or mobile communication devices 202, 208, 214, respectively. The communication device 202 of user A 204 is connected via a signal 206 to a mobile communication infrastructure 222. The communication device 208 of user B 210 is connected via a signal 212 to the same mobile communication infrastructure 222. However, the signal 218 between the communication device 214 of user C 216 and the mobile communication infrastructure 222 has been disconnected 220. User C 216 has unintentionally become disconnected from the communication between user A 204 and user B 210. In addition to detecting the communication device 220 has become disconnected due to signal loss, other means of determining an unintentional disconnection include: communication device 220 not transmitting an end call signal prior to disconnect, user not pressing an established key or key sequence to signify to a service provider purposeful disconnection, and the like.

A user connection monitoring and voicemail transfer (UCMVT) component 245 operates as a voicemail transfer upon disconnect (VTD) utility within the mobile communication infrastructure 222. The UCMVT manages wireless transmissions upon the unintentional disconnection 220 of the communication device 214 of user C 216. The communication device 214 of user C 216 is detected by the UCMVT 245 as being unintentionally disconnected from the telecommunications provider. The UCMVT 245 informs the remaining connected parties, e.g. user A 204 and user B 210, of the disconnection of user C 216. Users A 204 and B 210 are prompted, individually or as a group, regarding whether they would like to disconnect immediately, remain on the line, or leave a voicemail message for the disconnected party, i.e. user C 216, by being transferred to the 216 voicemail mailbox of user C 216.

In some embodiments, when a disconnection occurs, a user's voicemail system may play back an unintentional disconnection-specific voicemail greeting other than the standard voicemail greeting. User C 216 configures a disconnection-specific voicemail greeting to be played to remaining connected parties, e.g. user A 204 and user B 210 for use when a disconnection occurs during a later communication. The disconnection-specific voicemail greeting can be pre-recorded by user C 216, or automated at the UCMVT 245 component. In other embodiments, the standard voicemail greeting would be played. At the completion of the voicemail greeting play back, the disconnected user's (e.g., user C 216)

voicemail mailbox records a voicemail message from a remaining connected party (e.g., either user A 204 or user B 210, or both). When the disconnected party (user C 216) is capable of resuming telecommunications service, the disconnected party (user C 216) can be notified of new voicemail left by the previously remaining connected parties (user A 204 and user B 210) using methods known in the art.

Figure 3:
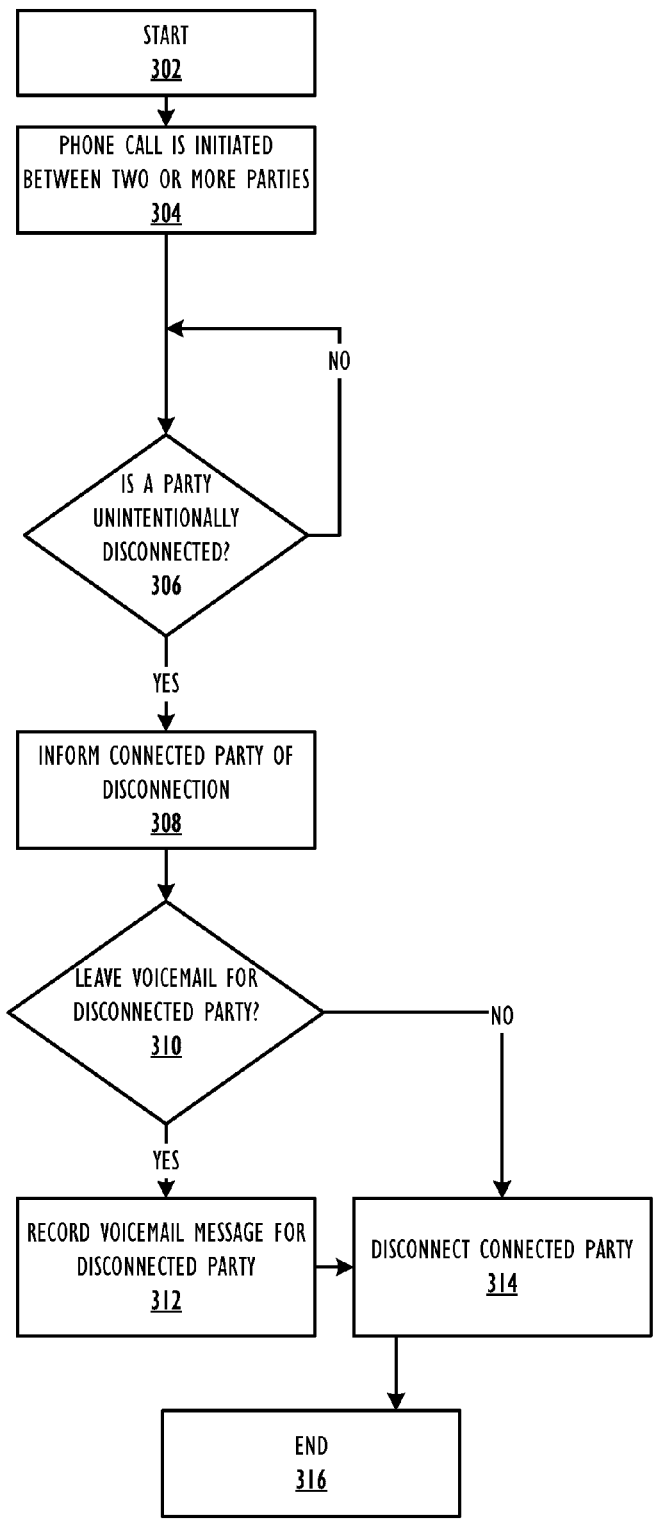
FIG. 3 is a flow chart of a general process by which the features of the invention are implemented, according to one embodiment of the invention.

FIG. 3 is a flow chart illustrating one method by which the above process of the illustrative embodiments is completed. Although the method illustrated in FIG. 3 may be described with reference to components shown in FIGS. 1 and 2, it should be understood that this is merely for convenience and alternative components and/or configurations thereof can be employed when implementing the method. Key portions of the method may be completed by VTD utility 145 executing within SPS 100 (FIG. 1) and controlling specific operations of/on SPS 100, and the method is thus described from the perspective of either/both VTD utility 145 and SPS 100.

The process of FIG. 3 begins at initiator block 302 and proceeds to block 304, at which a telecommunications or wireless telephone call is initiated between two or more parties. A determination is made at block 306 regarding whether a party to the telecommunication has become unintentionally disconnected from the transmission. If none of the parties have been unintentionally disconnected, the process repeats the determination step in block 306, until one of the parties is unintentionally disconnected. If one of the parties has been unintentionally disconnected, the remaining connected parties are informed of the unintentional disconnection of one of the parties, block 308. The remaining connected parties are given the option of leaving a voicemail for the disconnected party. A determination is made regarding whether one or more of the remaining connected parties elects to leave a voicemail message for the disconnected party, block 310. If none of the remaining connected parties want to leave a message for the disconnected party, the connected party's device is disconnected from the wireless transmission, block 314, and the process ends, block 316. If the remaining connected party elects to leave a voicemail message for the disconnected party, the disconnected party's voicemail system is invoked, and the connected party records a voicemail message for the disconnected party, block 312. Once the voicemail message has been recorded, the connected party is then disconnected, block 314, and the process ends, block 316. If the call is terminated at any point in the process, the process immediately ends, block 316.

Figure 4:
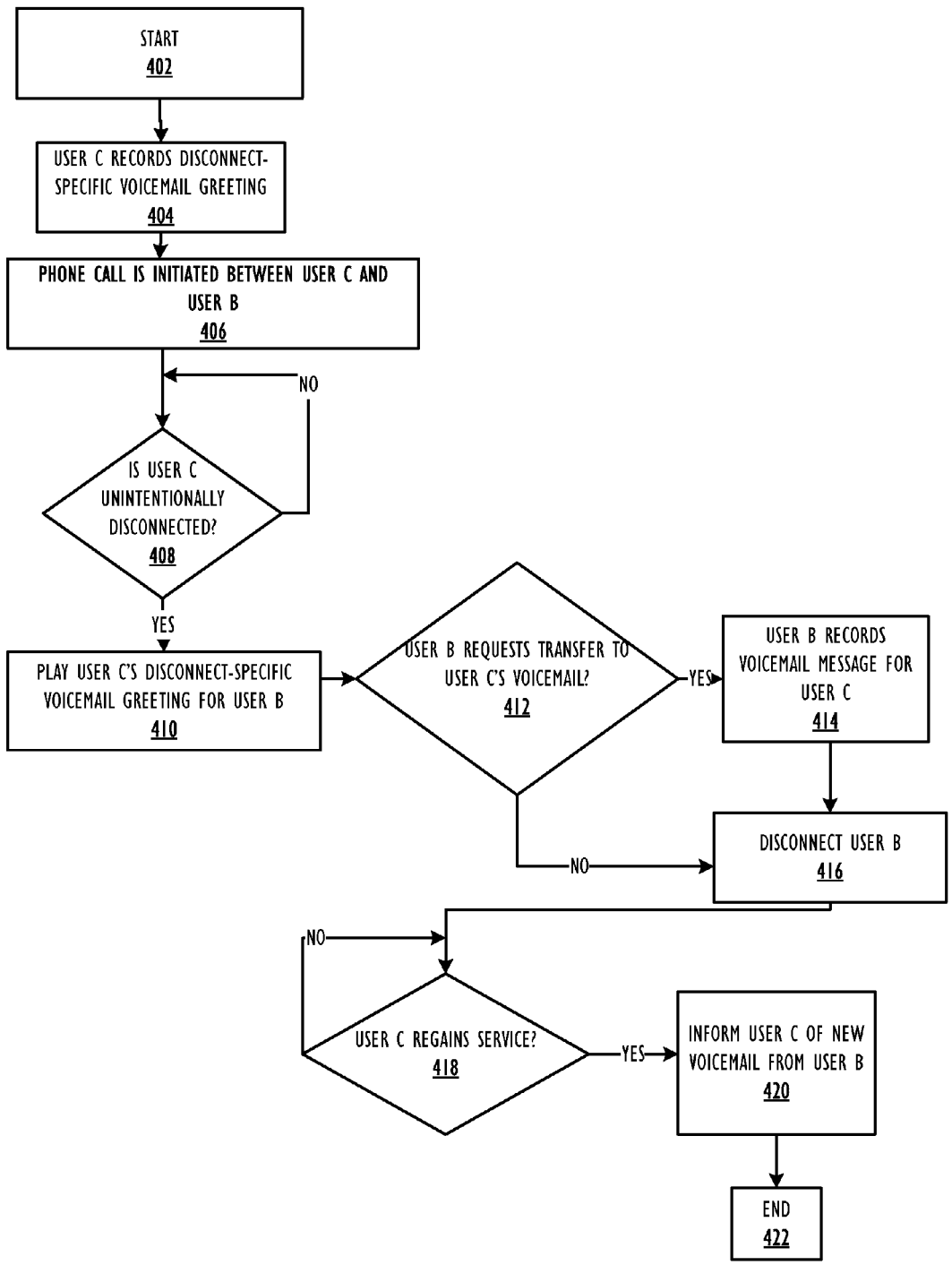
FIG. 4 is a flow chart showing a more detailed example of the process by which the features of the invention are implemented, according to one embodiment of the invention.

FIG. 4 is a flow chart illustrating one method by which the above process of the illustrative embodiments is completed. The process begins at initiator block 402, and proceeds to block 404 at which User C records a disconnect-specific voicemail greeting for use at a later time when User C unintentionally becomes disconnected from a transmission. A phone call is initiated between User C and another caller (i.e., User B), block 406. A determination is made at block 408 regarding whether User C has become unintentionally disconnected. If User C has not become unintentionally disconnected, the process repeats the step of determining whether User C is unintentionally disconnected. It is understood that User C may become disconnected intentionally, in which case, the invention would not detect an "unintentional" disconnection and would not apply.

If User C becomes unintentionally disconnected, the prerecorded disconnect-specific voicemail greeting is played from User C to User B, block 410. Upon completion of play back of the disconnected party's (i.e., User C's) voicemail greeting, a determination is made regarding whether the connected party (User B) would like to transfer to User C's voicemail mailbox and leave a voicemail message for the disconnected party (User C), block 412. If User B does not want to leave a voicemail message for User C, User B disconnects, block 416. If User B requests transfer to User C's voicemail mailbox, User B records a voicemail message for User C, block 414, before disconnecting, block 416. The process continues by making a determination regarding whether User C regains service, block 418. If User C does not regain service, the process repeats to the determining step at block 418 to determine whether User C regains service. If the disconnected party (User C) is successfully reconnected to the disconnected party's (User C's) telecommunications service, the disconnected party (User C) is notified of new voicemail message left during the disconnection, block 420, and the process ends, block 422.

In some embodiments, the system may insert a preamble before the disconnected party listens to a disconnection-specific voicemail, (e.g., a voicemail message indicating that the voicemail is a result of a disconnection). The preamble may also include the name or phone number of the connected party who left the voicemail message. In some embodiments, the preamble may also include the duration the parties were engaged in a wireless transmission before the connected party was transferred to the disconnected party's voicemail mailbox.

In some embodiments, the user may receive indicia indicative of voicemail related to the dropped call, such as via an alternate icon or textual information displayed on screen. Voicemail related to a dropped call may be processed ahead of any other voicemail in the queue, "fast pathed," and other processing to facilitate quicker and more convenient access by the user.

Some embodiments may contain methods enabling the connected party leaving a disconnect voicemail message to set an expiration time on the voicemail message. Expirations may be conveyed through known methods of detecting keypad tones or speech to text analysis. Multiple motivations exist for enabling voicemail expirations, for example, one party may be conversing with another party while they are in route to meet each other, potentially only minutes from their meeting place. At some point during their wireless communication, one party is unintentionally disconnected from the wireless communication and the connected party leaves a disconnect voicemail message that will not be of use once the parties meet each other. In such a scenario, the connected party may wish to set an expiration time for the disconnect voicemail message of five minutes.

In the flow chart above, the method may be embodied in a computer readable medium containing computer readable code such that a series of steps are performed when the computer readable code is executed on a computing device. In some implementations, certain steps of the method may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for managing unintentional disconnection of a communication device from a communication, the system comprising:
   a processor;
   a computer-readable tangible storage device;
   program instructions, stored on the storage device for execution by the processor, to detect that a first communication device has been unintentionally disconnected from an ongoing communication with a second communication device;
   program instructions, stored on the storage device for execution by the processor, to inform the second communication device that the first communication device has been unintentionally disconnected from the ongoing communication;
   program instructions, stored on the storage device for execution by the processor, to enable recording of a voicemail message for a voicemail mailbox of the disconnected first communication device by a party using the second communication device before disconnecting the second communication device from the ongoing communication;
   program instructions, stored on the storage device for execution by the processor, to enable recording of a disconnection-specific voicemail greeting that is different from a standard voicemail greeting by the first communication device for use in response to a disconnection of the first communication device from a communication; and
   program instructions, stored on the storage device for execution by the processor, to insert a preamble to the voicemail message, wherein the preamble indicates that the voicemail message is the result of the first communication device unintentionally disconnecting from the ongoing communication and includes one or more of:
      a name of the party using the second communication device;
      a phone number of the party using the second communication device; and
      a duration of the ongoing communication before the party using the second communication device was transferred to the voicemail mailbox of the disconnected first communication device.

2. The system of claim 1, further comprising program instructions, stored on the storage device for execution by the processor, to enable play back to the second communication device of the disconnection-specific voicemail greeting before disconnecting the second communication device.

3. The system of claim 1, further comprising:
   program instructions, stored on the storage device for execution by the processor, to enable the second communication device to set an expiration time for the voicemail message; and
   program instructions, stored on the storage device for execution by the processor, to delete the voicemail message in response to the expiration time occurring.

4. The system of claim 1, further comprising:
   program instructions, stored on the storage device for execution by the processor to, in response to resumption of service, inform the disconnected first communication device of the voicemail message; and
   program instructions, stored on the storage device for execution by the processor, to enable retrieval of the voicemail message.

5. The system of claim 1, said utility further comprising:
   program instructions, stored on the storage device for execution by the processor, to display indicia indicative of the voicemail message; and
   program instructions, stored on the storage device for execution by the processor, to prioritize processing the voicemail message.

6. A method of managing unintentional disconnection of a communication device from a communication, the method comprising:
   a computer detecting that a first communication device has been unintentionally disconnected from an ongoing communication with a second communication device;
   the computer informing the second communication device that the first communication device has been unintentionally disconnected from the ongoing communication;
   the computer enabling recording of a voicemail message for a voicemail mailbox of the disconnected first communication device by a party using the second communication device before disconnecting the second communication device from the ongoing communication;

the computer enabling recording of a disconnection-specific voicemail greeting that is different than a standard voicemail greeting by the first communication device for use in response to a disconnection of the first communication device from a communication; and the computer inserting a preamble to the voicemail message, wherein the preamble indicates that the voicemail message is the result of the first communication device unintentionally disconnecting from the ongoing communication and includes one or more of:
- a name of the party using the second communication device,
- a phone number of the party using the second communication device, and
- a duration of the ongoing communication before the party using the second communication device was transferred to the voicemail box of the disconnected first communication device.

7. The method of claim 6, further comprising the computer enabling play back to the second communication device of the disconnection-specific voicemail greeting before disconnecting the second communication device.

8. The method of claim 7, further comprising:
the computer enabling the second communication device to set an expiration time for the voicemail message; and
the computer deleting the voicemail message in response to the expiration time occurring.

9. The method of claim 7, further comprising:
in response to resumption of service, the computer informing the disconnected first communication device of the voicemail message; and
the computer enabling retrieval of the voicemail message.

10. The method of claim 9, further comprising:
the computer displaying indicia indicative of the voicemail message; and
the computer prioritizing processing of the voicemail message based on indicia.

11. A computer program product having code recorded on a tangible computer readable medium for managing unintentional disconnection of a communication device from a communication, said program product comprising code for:
detecting that a first communication device has been unintentionally disconnected from an ongoing communication with a second communication device;
informing the second communication device that the first communication device has been unintentionally disconnected from the ongoing communication;
enabling recording of a voicemail message for a voicemail box of the disconnected first communication device by a party using the second communication device before disconnecting the second communication device from the ongoing communication;
enabling recording of a disconnection-specific voicemail greeting that is different than a standard voicemail greeting by the first communication device for use in response to a disconnection of the first communication device from a communication; and
inserting a preamble to the voicemail message, wherein the preamble indicates that the voicemail message is the result of the first communication device unintentionally disconnecting from the ongoing communication and includes one or more of: a name of the party using the second communication device; a phone number of the party using the second communication device, and a duration of the ongoing communication before the party using the second communication device was transferred to the voicemail mailbox of the disconnected first communication device.

12. The computer program product of claim 11, further comprising code for:
enabling play back to the second communication device of the disconnection-specific voicemail greeting before disconnecting the second communication device.

13. The computer program product of claim 12, further comprising code for:
enabling the second communication device to set an expiration time for the voicemail message; and
deleting the voicemail message in response to the expiration time occurring.

14. The computer program product of claim 12, further comprising code for:
in response to resumption of service, informing the disconnected first communication device of the voicemail message; and
enabling retrieval of the new voicemail message.

15. The computer program product of claim 14, further comprising code for:
displaying indicia indicative of the voicemail message; and
prioritizing processing of the voicemail message.

* * * * *